Patented Jan. 7, 1947

2,413,789

UNITED STATES PATENT OFFICE 2,413,789

TREATMENT OF POLYVINYL ALCOHOL ARTICLES AND PRODUCTS

Robert Albert Scheiderbauer, Kenmore, N. Y., assignor to E. I. du Pont de Nemours & Company, Wilmington, Del., a corporation of Delaware No Drawing. Application June 18, 1943, Serial No. 491,393

14 Claims. (Cl. 117—138.8)

This invention relates to improvements in film, tubes and other shaped articles of polyvinyl alcohol. More particularly it relates to shaped articles of polyvinyl alcohol which articles are substantially water-insensitive at ordinary temperatures and which retain unimpaired, all of the desirable properties usually associated with polyvinyl alcohol; and to the method for treating articles of polyvinyl alcohol to render them water-insensitive without sacrificing the desirable characteristics of said articles.

Polyvinyl alcohol, a substance prepared by the substantially complete hydrolysis of polymerized vinyl acetate possesses many unusual and unique properties. Films and other shaped articles prepared from it are colorless, odorless, tasteless, transparent, exceedingly tough and unaffected by oils, greases, fats, hydrocarbons and most of the common organic solvents, including alcohols, esters, ethers, etc. They are also highly impermeable to gases, including hydrogen, helium, oxygen, etc. Because they possess these desirable properties, it might be expected that films of polyvinyl alcohol would be widely used as a wrapping tissue. However, polyvinyl alcohol is very sensitive to water. It dissolves in hot water (water heated to about 50° C. or higher) and is so highly swollen by cool water and even moisture that films and other shaped articles of it gelatinize and lose all semblance of their original shape. Films of this material are therefore unsuited for use in the wrapping of objects that may be subjected to the action of water or moisture vapor.

It has been suggested (U. S. 2,072,302, 2,138,751, 2,146,295, 2,173,304, 2,263,249, 2,270,323, Br. 322,-157, and Br. 386,161) that shaped articles of polyvinyl alcohol can be rendered insensitive to both hot and cold water by heating either alone or in the presence of an acidic catalyst. However, such treatment generally requires that the film be heated to temperatures of from 130° C. to 180° C. and these high temperatures not only tend to discolor the articles but also have an embrittling effect on them so that they are no longer entirely satisfactory for use as wrapping tissues or for other uses requiring a high degree of flexibility. It is also known to heat polyvinyl alcohol film for periods of 5 to 6 hours in a dry atmosphere at temperatures of from 70° to 90° C., whereby to decrease water sensitivity. However, here again, results are by no means satisfactory for a film so treated will, when immersed in cold water, gelatinize and lose all semblance of its original shape.

It is, therefore, an object of this invention to provide a process for converting a film, tube or other shaped article of polyvinyl alcohol into an article that retains the desirable physical properties of polyvinyl alcohol and that is permanently insoluble in and insensitive to cold water—that is, the article is so slightly swollen by cold water that it shows no tendency to gelatinize or lose its shape when placed in contact with cold water.

It is another object of this invention to provide a process for converting a film of polyvinyl alcohol into a similarly appearing film that is eminently suited for use as a wrapping tissue.

A still further object is to provide film, tubes and other shaped articles of polyvinyl alcohol which are permanently insensitive to cold water, and which have all of the desirable characteristics which ordinarily attach to the use of polyvinyl alcohol as a plastic base material. These and other objects will more clearly appear hereinafter.

The objects of this invention are accomplished in general by heating a shaped article of polyvinyl alcohol in the presence of air and an aqueous solution of a strong base having a concentration of at least 15% by weight, the articles being heated for periods of from about 1 to about 6 hours at temperatures of from about 50° C. to about 90° C.

Articles of polyvinyl alcohol so treated are still soluble in boiling water but are completely and permanently insoluble in and insensitive to water up to approximately 50° C. They show no tendency to gelatinize or become highly swollen on prolonged contact with water up to 50° C. They possess a high degree of flexibility and retain the toughness and resistance and impermeability to organic solvents and gases characteristic of untreated polyvinyl alcohol structures. Moreover, the articles acquire a very high elongation when wet with cold water (up to 50° C.), the wetted, stretched articles tending to revert to their original dimensions upon drying. Because of this surprising and unobvious property, films and tubular structures prepared in accordance with the invention find great use as shrinkable wrappings for the protection of irregularly-shaped articles.

Any water-soluble strong base such as the alkali-metal hydroxides; quaternary ammonium bases and the like are suitable for the purposes of this invention. Preferably the solutions contain about 30% by weight of the alkaline material. However, the concentration may vary from about 15% by weight up to saturation.

Air may be introduced by any convenient expedient, such as, for example, by first wetting the article to be treated with the aqueous base and thereafter heating the wetted article in air maintained at a high relative humidity; or the air may be bubbled through the solution of base in which is immersed the article of polyvinyl alcohol undergoing treatment. The effect of air in the process is not quite so pronounced as is that of the basic substance. However, the insolubilizing effect of the invention is achieved in much shorter time where the article is exposed to large volumes of air; hence it is preferred to employ that expedient which permits of the maximum exposure of the article to air.

The temperature employed must be maintained within the limits of from about 50° C. to about 90° C. If the temperature is below 50° C., the article will not be rendered completely insoluble in cold water. On the other hand, if the temperature greatly exceeds 90° C., the product will tend to become colored and embrittled.

The duration of the treating period is dependent not only on the concentration of the caustic solution and the amount of air available to the article, but also on the temperature employed. In general, when the caustic solution contains approximately 30% caustic by weight and the article is heated to from 50° C. to 90° C., in the presence of excess air by heating the film in a humidity chamber or bubbling air through the treating solution, treating periods of from 6 to 1 hour will suffice.

The following examples illustrate preferred methods of practicing this invention. These examples are, of course, to be considered only as illustrative of, and not as limiting the scope of the invention. Parts and percentage compositions are by weight unless otherwise indicated.

Example I

A film prepared from polyvinyl alcohol obtained by the substantially complete hydrolysis of vinyl acetate and possessing a viscosity of 24 centipoises in 4% aqueous solution at 20° C. was steeped for a period of 2 minutes in a 33% aqueous solution of sodium hydroxide containing 0.06% Aerosol O. S. (isopropyl naphthalene sodium sulfonate), as a wetting agent, the solution being maintained at room temperature. The film, still wet with caustic solution, was then heated for 2½ hours in air maintained at 70° C. and 100% relative humidity. It was then washed free of caustic and dried. The dried film was found to have substantially the toughness, strength and flexibility of the original film. However, although still soluble in boiling water, it was completely insoluble in, and substantially unswollen by water up to 50° C. When wet with cold water, the film showed no tendency to lose its shape. The wet film displayed considerable strength and could be stretched to twice its original length without breaking. When dried without tension the stretched film reverted to its original dimensions. The film, after standing for an extended period of time, still possessed these desirable properties. It was still insoluble in and showed no tendency to gelatinize in cold water.

Example II

A polyvinyl alcohol film similar to that employed in Example I was immersed in an aqueous 31% solution of sodium hydroxide, maintained at 90° C., a brisk stream of air being bubbled through the solution and about the film. At the end of 4 hours, the film was removed from the solution, washed free of sodium hydroxide with cold water and dried. The final film resembled that obtained in Example I in all respects, including not only its solubility characteristics in water but also in its physical properties in both the dry and wet states.

This invention makes possible the conversion of a shaped article of polyvinyl alcohol into an article that is completely and permanently insoluble in cold water and substantially unswollen by contact with it. At the same time, the article retains the desirable strength, toughness and flexibility and resistance and impermeability to organic solvents and gases that is characteristic of articles of polyvinyl alcohol. The article also possesses a good wet strength and a wet elongation of approximately 200%. Moreover, the article is still readily soluble in hot water and because of this fact articles of polyvinyl alcohol treated in accordance with this invention find many practical uses. For example, stretched films obtained in this manner can be employed as shrinkable, protective wrappings for objects such as silverware that tarnish on exposure to oxygen and various other gases present in the atmosphere. Because of its insensitivity to cold water, the wrapping is not damaged, as is a wrapping of untreated polyvinyl alcohol, by accidental contact with cold water. At the same time, the wrapping can be readily removed by immersion in hot or boiling water. Other uses that suggest themselves include the use of a film or pellicle of this invention in a single-time use safety valve diaphragm responsive to changes in temperature of water. So long as the temperature is below 50° C. the diaphragm will remain in position. However, as the temperature rises above this figure, the diaphragm will dissolve to permit the passage of cool water. The invention thus provides a simple process for the conversion of articles of polyvinyl alcohol into articles that are eminently suited for many uses.

It will be apparent from the above description that the process and products of this invention are susceptible to extensive modification and variation without departing from the spirit and scope of the invention as defined in the appended claims, and it is to be understood, therefore, that the invention comprehends all such modifications and extensions thereof.

I claim:

1. A process for improving the water resistance of shaped articles of polyvinyl alcohol which comprises heating said shaped articles in contact with an aqueous solution of a strong base containing at least 15% by weight of base, and air at a temperature of from about 50° to about 90° C., whereby said shaped articles are rendered substantially and permanently insensitive to water below about 50° C.

2. A process for improving the water resistance of shaped articles of polyvinyl alcohol which comprises heating said shaped articles in contact with an aqueous solution of a strong base containing at least 15% by weight of base, and air at a temperature of from about 50° to about 90° C. for a period of from about 1 to about 6 hours whereby said shaped articles are rendered substantially and permanently insensitive to water below about 50° C.

3. A process for improving the water-resistance of shaped articles of polyvinyl alcohol which comprises heating said shaped articles in contact with an aqueous solution of a strong base containing about 30% by weight of base, and air at a temperature of from about 50° to about 90° C. for a period of from about 1 to about 6 hours whereby said shaped articles are rendered substantially and permanently insensitive to water below about 50° C.

4. A process for improving the water resistance of shaped articles of polyvinyl alcohol which comprises heating said shaped articles in contact with an aqueous alkali metal hydroxide solution containing at least 15% by weight of alkali metal hydroxide, and air at a temperature of from about 50° to about 90° C. for a period of from about 1 to about 6 hours, whereby said shaped articles are rendered substantially and permanently insensitive to water below about 50° C.

5. A process for improving the water resistance of shaped articles of polyvinyl alcohol which comprises heating said shaped articles in contact with an aqueous alkali metal hydroxide solution containing about 30% by weight of alkali metal hydroxide, and air at a temperature of from about 50° to about 90° C. for a period of from about 1 to about 6 hours, whereby said shaped articles are rendered substantially and permanently insensitive to water below about 50° C.

6. A process for improving the water resistance of shaped articles of polyvinyl alcohol which comprises heating said shaped articles in contact with an aqueous sodium hydroxide solution containing at least 15% by weight of sodium hydroxide, and air at a temperature of from about 50° to about 90° C. for a period of from about 1 to about 6 hours, whereby said shaped articles are rendered substantially and permanently insensitive to water below about 50° C.

7. A process for improving the water resistance of shaped articles of polyvinyl alcohol which comprises heating said shaped articles in contact with an aqueous sodium hydroxide solution containing about 30% by weight of sodium hydroxide, and air at a temperature of from about 50° to about 90° C. for a period of from about 1 to about 6 hours, whereby said shaped articles are rendered substantially and permanently insensitive to water below about 50° C.

8. A process for improving the water resistance of shaped articles of polyvinyl alcohol which comprises wetting said shaped articles with an aqueous solution of a strong base containing at least 15% by weight of base, and thereafter heating the wetted articles in air maintained at a relative humidity of about 100% and at a temperature of from about 50° to about 90° C., for a period of from about 1 to 6 hours whereby said shaped articles are rendered substantially and permanently insensitive to water below about 50° C.

9. A process for improving the water resistance of shaped articles of polyvinyl alcohol which comprises immersing said shaped articles for a period of from about 1 to about 6 hours in an aqueous solution of a strong base containing at least 15% by weight of base, and maintained at a temperature of from about 50° C. to about 90° C., and constantly passing air through said solution whereby said shaped articles are rendered substantially and permanently insensitive to water below about 50° C.

10. The process according to claim 8 wherein the strong base is sodium hydroxide.

11. The process according to claim 9 wherein the strong base is sodium hydroxide.

12. The process which comprises wetting film of polyvinyl alcohol with an aqueous sodium hydroxide solution containing 33% by weight of sodium hydroxide, heating the wet film for 2½ hours in air maintained at 70° C., and at a relative humidity of 100%, washing said film free of sodium hydroxide, and drying said film whereby said film is rendered substantially and permanently insensitive to water below about 50° C.

13. An article of modified polyvinyl alcohol modifies according to the process of claim 1, said article being further characterized by being insoluble in, and substantially unswollen by water below about 50° C., and by having a wet elongation of about 200%.

14. A film of modified polyvinyl alcohol modified according to the process of claim 1, said film being further characterized by being insoluble in, and substantially unswollen by water below about 50° C., and by having a wet elongation of about 200%.

ROBERT ALBERT SCHEIDERBAUER.